United States Patent
Hughes, Jr.

[11] 3,717,865
[45] Feb. 20, 1973

[54] STUD WELDING BAD WELD DETECTION CIRCUIT

[75] Inventor: James S. Hughes, Jr., Bellmawr, N.J.

[73] Assignee: Omark Industries, Inc.

[22] Filed: June 30, 1970

[21] Appl. No.: 51,271

[52] U.S. Cl.............340/267 W, 219/109, 219/110, 340/419
[51] Int. Cl............................................G08b 21/00
[58] Field of Search..340/419, 267 W; 219/109, 110, 219/98

[56] References Cited

UNITED STATES PATENTS

| | | | |
|---|---|---|---|
| 3,546,421 | 12/1970 | Meyer et al. | 219/110 |
| 3,345,493 | 10/1967 | Guettel et al. | 219/110 |
| 3,191,441 | 6/1965 | Erickson | 219/110 X |
| 3,445,768 | 5/1969 | Ferguson | 219/109 X |
| 3,334,341 | 8/1967 | Green | 219/109 X |

*Primary Examiner*—David L. Trafton
*Attorney*—Charles F. Duffield

[57] ABSTRACT

Apparatus for use with stud welding equipment employing a stud welding gun, a power supply and a controller for initiating the welding cycle and controlling the discharge of welding energy from the power supply across the stud and workpiece which detects the occurrence of bad welds and operates to generate an alarm signal and/or discontinue further operation of the welding apparatus. A first circuit is employed across the welding power supply and senses the discharge thereof to generate a first signal indicative that a normal weld has occurred. A second circuit connected through the controller generates a second signal upon the weld command to the controller indicating an attempted weld. The first and second signals are fed into a binary counter wherein the first signal indicating a successful weld resets the counter to 0 and the second signal indicating the weld command advances the counter to a count of 1. Upon the occurrence of the first bad weld indicated by the absence of a first signal, the second signal will advance the binary counter to a binary count of 2 upon which a signal light will be turned on. Upon the second successive weld failure, the next appearing second signal indicating a second weld command will advance the binary counter to a count of 3 which functions through circuit relays to disable the welding apparatus from further operation. One bad weld followed by a normal weld will result in the first signal resetting the binary counter to 0 and permitting continued operation.

9 Claims, 2 Drawing Figures

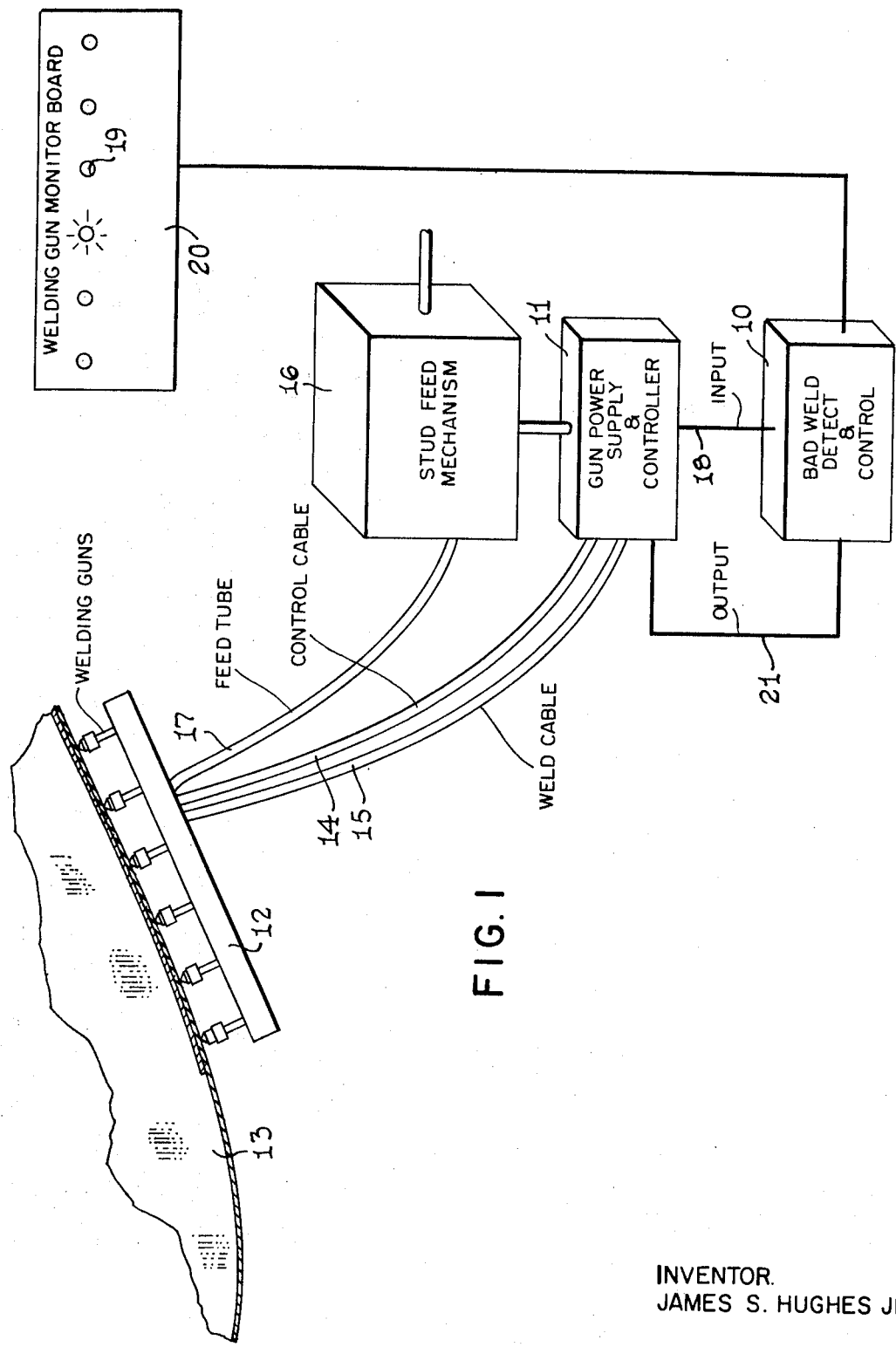

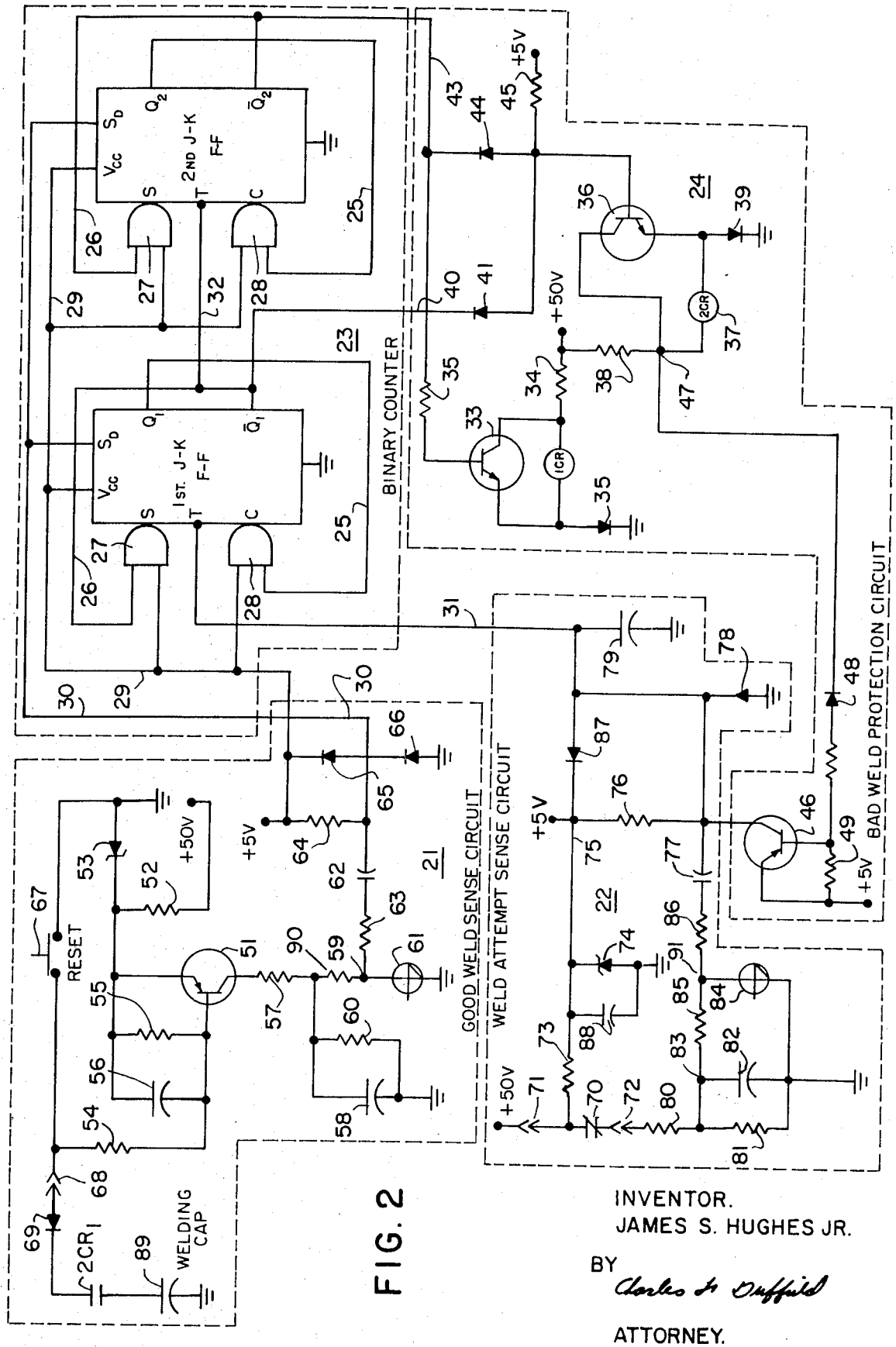

STUD WELDING BAD WELD DETECTION CIRCUIT

BACKGROUND OF INVENTION

The present invention is related to automatic stud welding apparatus employing a multitude of welding guns which are automatically operated and, more specifically, to circuit means for detecting the occurrence of one or more bad welds at any one of the welding guns.

Stud welding is a technique in which a metallic stud is welded to a workpiece by means of a high energy current discharge through the stud and across the contiguous portions of the stud and workpiece resulting in melting of the contiguous portions of the stud or workpiece with resultant fusion of the two upon solidification. This process was initially employed in single unit welding guns which were closely observed by the operators. The technique has advanced considerable and today stud welding is used in mass production industries such as the automotive industry.

Equipment employed in such a mass production industry will employ a multitude of welding guns and will be operating in areas remote from the operator. Under such conditions, it is possible that one or more of the units will malfunction and go unnoticed for a substantial period of time. When such a malfunction occurs, the quality of the work being done is, of course, affected and there is a great likelihood that the equipment will harm itself on continued operation.

SUMMARY AND OBJECTS OF INVENTION

The present invention overcomes the difficiencies of the prior devices in providing a bad weld detection circuit which will detect one or more bad welds at a given welding gun and operate to signal the occurrence of the first bad weld and, upon the occurrence of the second successive bad weld, disable the affected piece of equipment from further operation until repairs are accomplished.

In accordance with the present invention, a first circuit detects the discharge of the welding power supply across the stud and workpiece thus indicating a good weld and, in response thereto, generates a first signal. A second circuit is connected through the controller and is responsive to a weld command in the controller to generate a second signal which is indicative of an attempted or commanded weld. The second signal is so timed as to occur after the first signal in a normal operating sequence.

Both the first and second signals are passed to a binary counter. The first signal provides the input for the binary counter to reset the binary counter to 0 upon the occurrence of the first signal. The second signal provides the input or clock pulse to the binary counter to cause the counter to successively count. At the end of every normal weld cycle, the binary counter will have advanced to a count of 1 being reset to 0 during the next welding cycle and back to 1 and so on. Upon the occurrence of the first bad weld, indicated by the absence of a first signal, the next occuring weld command will generate a 2 count in the binary counter. Likewise, a 3 count will be generated in the binary counter upon the second successive weld failure indicated by the absence of a second resetting first pulse.

A bad weld monitering board is provided and is responsive to the second digit output of the binary counter upon the occurrence of a 2 count to turn on a signal light representing a first bad weld. Circuit means connected between the controller and both of the first column and second column digital outputs of the binary counter are responsive to a 3 count to disable the controller from continuing further weld cycles.

Other objects and advantages of the bad weld detection circuit of the present invention will become apparent from the detailed description thereof which follows taken in conjunction with the drawings.

DESCRIPTION OF DRAWINGS

FIG. 1, is a schematic view of the bad weld detection and control circuit of the present invention as connected in respect to the gun power supply and control, stud feeding mechanism and welding guns, and FIG. 2, is a diagram of the circuit comprising the stud weld detection circuit of the present invention.

DETAILED DESCRIPTION OF INVENTION

The environment in which the stud weld detection circuit of the present invention is employed is shown in FIG. 1 of the drawings. The no weld detection control circuit generally indicated at 10 may be employed with any one of a number of commercially available and well known controllers and power supplies generally indicated at 11. Such controllers are responsible for initiating the welding cycle for controlling a plurality of welding guns 12 which are utilized for welding studs to such members as automobile bodies 13.

The controller 11 will control and sense the operation through a control cable 14 and at an appropriate time will command the power supply to discharge the welding current through a welding cable 15 to effect the weld through the stud and the automobile body. At a further time in the welding sequence, the controller will command a stud feed mechanism 16 to dispatch another stud to the welding guns through a feed tube 17.

Only one set of welding cables, control cables and feed tubes have been shown in FIG. 1 for the purposes of simplicity. However, it is to be understood that there will be a weld cable, control cable and feed tube for each of the welding guns employed in the system.

As will be apparanet from the detailed description of the invention following hereinafter, the no weld detection and control circuit of the present invention is so designed such that it may be readily adapted to any standard power supply and controller to detect the occurrence of bad welds and to take certain protective steps following the occurrence of one or more bad welds. In general, the no weld detection and control apparatus through an input 18 senses (1) a good weld and (2) each attempt to weld. The information is converted into a count of the respective bad welds and, upon the occurrence of the first bad weld, an indicator light 19 on a welding gun monitor board 20 is turned on indicating the particular gun involved.

Upon the second bad weld, the no weld detection control apparatus 10, through an output 21 to the gun power supply and controller 11, disables the controller from initiating any further feeding signals to the involved welding gun.

The specific circuitry involved in the no weld detection and control circuit of the present invention is shown in FIG. 2 of the drawings. The entire schematic generally can be broken down into four functional component groups each outlined in dotted lines. The first and second component groups respectively are the good weld sense circuit 21 and the weld attempt sense circuit 22. These two circuits provide two inputs to the third component group comprising a binary counter 23. The output of the binary counter becomes the input to the fourth component group 24 which is the bad weld detection circuit which, as hereinafter described, functions to signal the bad weld and to disable the equipment from continued operation.

The function of the good weld sense circuit 21 is to sense each time the power supply is discharged through the stud welding gun and to provide a negative going pulse at this time. As a general rule, if the power supply effectively discharges through the stud welding gun, this will be indicative of a successful weld, and, in the converse, a weak or omitted energy discharge from the power supply during the welding cycle is indicative of a bad weld. Accordingly, the logic in the good weld sense circuit 21 is the omission of a negative pulse each time a bad weld occurs.

The general function of the weld attempt sense circuit 22 is to provide a like negative going pulse each time a weld command is initiated in the controller. Such a weld command will occur in the controller irrespective of whether or not a successful weld is accomplished and this will be true each time the welding gun attempts to weld in spite of continued weld failures. Thus, the logic in the weld attempt sense circuit is a negative pulse for every attempted weld without regard to the success of the weld.

The weld attempt sense circuit 22 is so designed that it will provide the negative pulse subsequent to the occurrence of the negative pulse from the good weld sense circuit 21 under normal welding conditions. Accordingly, under normal welding conditions and for a given welding cycle, the good weld sense pulse will occur first followed by the welding attempt sense pulse. In the event of a first bad weld, there will be no good weld sense pulse and only a weld attempt sense pulse from circuit 22 will be present. Likewise, if the next successive weld cycle has a second bad weld, there will be no good weld sense pulse but a further weld attempt sense pulse will be present representing the third successive such pulse from circuit 22 only.

The logic from the good weld sense circuit 21 and the weld attempt sense circuit 22 is applied as the inputs to the binary counter component group 23. The general function of the binary counter 23 is to utilize the input from the good weld sense circuit 21 as a reset to the counter and the input from the weld attempt sense circuit 22 as a transfer function to successively count in binary code. Keeping in mind that the weld attempt sense pulse will follow the pulse from the good weld sense circuit 21, the binary counter will function as follows. Upon a good weld being effected, a pulse will be received by the binary counter from the weld circuit 21 and the counter will be reset to 0. The following weld attempt sense pulse will register a 1 count in the binary counter. During the next weld cycle, if the weld is successful, the counter will again be reset to 0 and advance to 1 as just described. However, if a good weld sense pulse is not received in the next weld cycle thus indicating a bad weld, the weld attempt sense pulse next following will advance the binary counter to a binary count of 2. Likewise, if a second successive bad weld occurs, the next following weld attempt sense pulse will advance the binary counter to a binary count of 3.

The specific binary counter employed in the schematic of FIG. 2 is two directly coupled flip-flops operating on the master-slave principle and connected in the J-K configuration. Such integrated circuits are commercially available and in one embodiment of the invention, a Motorola MC 856 Dual J-K flip-flop was employed.

Each of the J-K flip-flops includes a master flip-flop and a slave flip-flop. By reason of the J-K configuration, the Q output of the slave is returned as one of the inputs to the AND gate at the clear input of the master and the $\overline{Q}$ output of the slave is returned as one of the inputs of the AND gate at the set input of the master through conductors 25 and 26 respectively.

In the particular configuration employed, one-half of the inputs to each of the set and clear AND gates 27 and 28 respectively were continuously biased on by being in common with the Vcc input of the binary counter via conductor 29 which originates at a plus 5 volt power source.

The output of the good weld sense circuit 21 provides an input to the binary counter via conductor 30 to a common connection to the set direct inputs of each of the J-K flip-flops. The particular Dual J-K flip-flops employed are ones in which a set direct pulse will reset both the master and slave to a high output at the Q terminal upon a low set direct input except that, in some situations (which cause no problems in this circuit) the master will have both outputs set to a low state.

The weld attempt sense circuit pulses provide an input via conductor 31 to the transfer terminal of the first J-K flip-flop. The $\overline{Q}_1$ output of the first J-K flip-flop is connected as the input transfer signal to the second J-K flip-flop via conductor 32. In operation during the welding cycle, a good weld sense pulse will be received first indicating a good weld has been accomplished. This pulse will be transferred via conductor 30 to the set direct of each flip-flop setting the flip-flops to a binary count of 0, looking at the $\overline{Q}_1$ and $\overline{Q}_2$ terminals of the first and second J K flip-flops respectively. Shortly thereafter and in the same welding cycle, the weld attempt sense circuit will produce a low pulse which will be transferred via conductor 31 to the transfer terminal of the first J-K flip-flop. At this time, the set direct pulse will have passed and $Q_1$ will be high enabling AND gate 28. Upon the appearance of a transfer pulse, the state of the master which had been set by AND gate 28, will be transferred to the slave in the first flip-flop and $\overline{Q}_1$ will become high. At this time, the binary counter will have a binary count of 1.

Assuming that in the next following weld cycle there is a successful weld, there will then again be the appearance of another good weld sense pulse which will be applied to each of the set directs on the first and second flip-flops. This pulse will drive the first flip-flop back to a binary count of 0 as viewed from terminal $\overline{Q}_1$.

In detail, the following events will occur during a set direct, whatever the initial state of the binary counter.

The transfer input to the first J-K flip-flop will remain high because the low weld attempt sense pulse is not coming in at this time. This will keep the first master flip-flop under control of the combination of the first slave flip-flop and the set direct.

The set direct will cause the first slave to assume the set state. There will be no interference from the master, since the transfer input is high, prohibiting the master from transferring information to the slave.

The first master will now, in the MOTOROLA MC 856, try to follow both the set direct and the high signal from $Q_1$. As a result, both sides of the master will go low, but this state is only temporary, as explained below.

Also upon the assumption by the first slave flip-flop of the set state, $\overline{Q}_1$ will provide a transfer signal to the transfer of the second J-K flip-flop, causing the second master flip-flop to become insensitive to the inputs to its AND gates 27 and 28, and to try to impose its state upon the second slave flip-flop. The set direct, will, however, whatever the initial states of the second master and slave flip-flops, set both to the set state.

As the set direct goes high again, the first slave flip-flop stays in the set state, since the first master flip-flop can have no control over it until the first transfer input goes low due to an incoming weld attempt sense pulse.

The first master flip-flop, which had both outputs low (in the Motorola MC 856) comes again under control of the first slave flip-flop, which sets the first master flip-flop to the clear state.

The second master flip-flop stays in the set state, since $Q_1$ continues to render it insensitive to its inputs.

The second slave flip-flop stays in the set state, since the second master flip-flop continues to impose the set state upon it.

Assume now that in the next weld cycle a bad weld has occurred. The bad weld will be indicated by the absence of a set direct pulse to the binary counter. The weld attempt sense pulse which follows in turn will set the first flip-flop to 0 at $\overline{Q}_1$ since, prior to the occurrence of the weld attempt sense (transfer) pulse, $\overline{Q}_1$ was high enabling AND gate 27 which set the first master flip-flop to 1 (set). As $\overline{Q}_1$ goes negative a transfer signal will be passed to the second flip-flop. $\overline{Q}_2$ will be set to 1 since the previous high on $Q_2$ had enabled AND gate 28 setting the master in the second flip-flop to 1 (clear) at $\overline{Q}_2$. At this point, the binary counter has registered a binary count of 10 or two as viewed at the $\overline{Q}$ outputs.

At this point, if in the next following weld cycle a good weld occurs, there will be a good weld sense pulse from circuit 21 which will be applied to the set directs of both the first and second flip-flops which will reset them to a binary count of 0 at both $\overline{Q}_1$ and $\overline{Q}_2$. On the other hand, if there is a second successive bad weld, then the next occurring weld attempt sense pulse at the transfer input of the first flip-flop will cause the first flip-flop to transfer the 1 in the master flip-flop, which has been imposed by the 1 at Q, on the AND gate 28, to $\overline{Q}_1$ in the slave. As $\overline{Q}_1$ goes high, there will be no transfer function occurring in the second flip-flop. Accordingly, the binary counter will now register a binary count of 11 or three with both $\overline{Q}_1$ and $\overline{Q}_2$ being high.

Set out below is a table representing the state of $\overline{Q}_1$ and $\overline{Q}_2$ in respect to time.

| TIME | $\overline{Q}_2$ | $\overline{Q}_1$ |
|---|---|---|
| End of Normal Weld | 0 | 1 |
| After 1st bad Weld | 1 | 0 |
| After 2nd bad Weld | 1 | 1 |

The bad weld protection circuit 24 is designed to interpret the outputs of $\overline{Q}_1$ and $\overline{Q}_2$ in accordance with the table above to provide two basic functions. The first function is to turn on a light on the welding gun monitoring board 20 as shown in FIG. 1 upon the occurrence of one or more bad welds. The second function of the bad weld protection circuit 24 is, upon the occurrence of the second successive bad weld, to disable the welding controller from feeding any additional studs to the affected gun, and thereby from continuing to weld.

The first function, i.e., turning on the monitoring light, is accomplished through transistor 33 and control relay 1CR. A 50 volt source is applied across 1CR through current limiting resistor 34 and biasing diode 35 to ground. Under normal operating conditions, transistor 33 will be shut off and 1CR will be energized. So long as 1CR is energized its normally closed contacts in the light circuit in the welding gun monitor board 20 will be open and the light will be extinguished.

Transistor 33 with the assistance of the bias on the biasing diode 35, will remain turned off so long as there is a 0 or low on $\overline{Q}_2$. In turn, $\overline{Q}_2$ will always remain low so long as there is a count of one or less in the binary counter. However, upon the occurrence of the first bad weld, as may be seen from the table above, $\overline{Q}_2$ will become 1 (high). As $\overline{Q}_2$ goes high, there will be sufficient base to emitter bias upon transistor 33 to turn the transistor on. As transistor 33 turn on, 1CR will be shunted, thereby turning on the particular light associated with that control relay on the welding gun monitor board 20 indicating a first bad weld. Resistor 34 limits the current passing through transistor 33.

The second function of the bad weld protection circuit 24 i.e. to disable the controller from continuing with further weld cycles, is accomplished by means of transistor 36 and control relay 2CR. During normal operation the 50 volt power applied through current limiting resistor 38 energizes control relay 2CR through biasing diode 39. Control relay 2CR has contacts in the controller 11 (FIG. 1) which could serve any number of functions. Onse such function in the present design is, when 2CR is operated, to close a circuit necessary for operation of the stud feeding mechanism. Another such function may be to control the entire power supply to the controller or the gun power supply. In any event, the control relay 2CR may be employed in any desired function such that the de-energization of the control relay will interrupt the welding cycle of the controller in whole or in part.

Transistor 36 will remain turned off thus permitting control relay 2CR to continue to be energized so long as there is a 0 or low on either or both outputs $\overline{Q}_1$ or $\overline{Q}_2$ of the binary counter. This is accomplished through connecting the base of transistor 36 through isolation diode 41 to the output $\overline{Q}_1$ of the first flip-flop and through isolation diode 44 to the output $\overline{Q}_2$ of the second flip-flop. In this configuration, so long as there is a low on either output $\overline{Q}_1$ or $\overline{Q}_2$, the 5 volt source impressed upon the base of the transistor 36 through a current limiting resistor 45 will be unable to raise the voltage at the base of the transistor sufficiently to turn the transistor 36 on, especially with the bias voltage on the biasing diode 39 causing the transistor 36 to require a rather high voltage at its base for turn on to occur.

Upon the occurrence of a binary count of 3 in the binary counter which will represent two successive bad welds both $\overline{Q}_1$ and $\overline{Q}_2$ will go high. Upon this occurrence, the 5 volt power supply will be able through resistor 45 to raise the base emitter potential across transistor 36 sufficiently to turn the transistor on. As transistor 36 turns on, control relay 2CR will be shunted and, accordingly, de-energized. Transistor 36 employed in the particular circuit is a Darlington transistor and accordingly demonstrates an extremely high gain which is particularly beneficial when employed with the low output of the binary counter.

As control relay 2CR drops out, as above explained, the relay contacts associated with the control relay which are located in the controller will affect the continued operation of the controller in whatever desired manner, e.g. shut off any further feeding of studs to the welding guns, disable power to the power supply or shut down the entire controller.

In the case where control relay 2CR does not shut down the entire welding apparatus, a further problem will exist. For example, in the next attempted weld, the next pulse from the weld attempt sense circuit 22 will cause the binary counter to go to a binary count of 4 which will in turn drive $\overline{Q}_1$ and $\overline{Q}_2$ to 0 or low. As this will happen, the bad weld protection circuit 24 will be rendered ineffective since both control relays 1CR and 2CR will become re-energized extinguishing the monitoring board light and reclosing the contacts in the controller permitting continued operation of the welding apparatus.

The above effect is prevented by the bad weld protection circuit of the present invention by means of a transistor 46. Whenever control relay 2CR is energized, thus meaning transistor 36 is turned off, the 50 volt power supply will be divided across resistor 38 and control relay 2CR. The impedance of control relay 2CR is such that the resultant potential at the point 47 will be sufficiently high as to bias the cathode of the diode 48 above the 5 volt potential applied to the emitter of transistor 46, thus maintaining the transistor shut off. Diode 48 prevents the destruction of the transistor 46 by reverse base-emitter bias.

As transistor 36 turns on, point 47 approaches substantially ground potential. In this condition, the 5 volt potential on the emitter of transistor 46 will be divided across emitter base resistor 49 and current limiting resistor 50 such as to turn the transistor on. When this occurs, the collector voltage on transistor 46 will rise to approximately 5 volts. This potential will be applied to conductor 31 which is the input to the binary counter from the weld attempt sense circuit 22 and will be sufficient to override any attempted negative pulse generation in the circuit thus maintaining the binary counter at a count of binary 3.

The particular bad weld protection circuit 24 includes a further protection against resetting the binary counter following the second bad weld detection. This is accomplished through a set of contacts 2CR₁ in the weld sense circuit 21. Whenever relay 2CR is de-energized upon the occurrence of two successive bad welds, contacts 2CR₁ will open preventing weld circuit 21 from sensing any further change in the welding capacitor voltage and from generating a good weld sense pulse as described hereinafter. In this way, the circuit will guard against any inadvertent or delayed discharge of welding source energy generating a set direct pulse which would reset binary counter and render the bad weld protection circuit ineffective.

The weld sense circuit 21 in the embodiment shown in FIG. 2 is designed to be operated in conjunction with a power supply of capacitor-discharge type. The circuit is connected across the welding capacitor 89 and senses the voltage on the capacitor. During the operation of a normal welding cycle, the capacitor will be charged to approximately 120 volts. Upon a successful weld, the capacitor will generally discharge to 18 volts or lower. The weld sense circuit is designed to sense whenever the welding capacitor has dropped below 18 volts at which time the weld sense is generated.

The weld sense circuit 21 employs a transistor 51 whose emitter is connected through a current limiting resistor 52 to a 50 volt vpower supply. A Zener diode 53 from resistor 52 to ground is selected to maintain the emitter voltage of transistor 51 at approximately 18 volts.

As earlier described, contacts 2CR₁ will be closed during normal operation of the welding apparatus. Accordingly, whenever the welding capacitors are charged above 18 volts, the applied bias on the cathode of the protective diode 69 (which diode protects the transistor 51 from being destroyed by excessive base-emitter voltate when there is a high voltage on the welding capacitor 89) will maintain the transistor 51 turned off. During the welding cycle, when the capacitor is discharged across the stud and workpiece, and at which time the capacitor voltage falls below 18 volts, then the bias on the cathode of diode 69 will fall below the emitter voltage of transistor 51 and sufficient base current will be established through current limiting resistor 54 to turn the transistor 51 on.

Resistor 55 across the emitter to base junction of the transistor provides suppression for the collector to emitter leakage in a well know manner. Capacitor 56 provides for noise suppression across the emitter base junction.

As transistor 51 turns on, the current flow through the transistor will pass through resistor 57 and begin charging capacitor 58. Capacitor 58 will provide a time delay before the voltage at .59 rises to the firing voltage of the silicon unilateral switch 61 hereinafter described.

A silicon unilateral switch 61 is applied across .59 and the ground. The particular unilateral switch employed is designed to breakdown at approximately 8 ¼ volts and will maintain a voltage of approximately 1 volt following breakdown. The unilateral switch is maintained in the open base configuration as indicated.

Prior to the breakdown of the unilateral switch 61, the voltage will be rising at .59. As the voltage rises, capacitor 62 will be charged through current limiting resistor 63 and biasing resistor 64 back into the 5 volt power supply. A diode 65 requires approximately 1 volt forward bias to conduct and will be effective to assure that the charging of capacitor 62 through resistor 64 will not raise conductor 30, which is the input to the set directs of the Dual J-K flip-flop, significantly above 5 volts, thus protecting the integrated circuit from damage due to excessive voltage. The diode 65 may also serve the function of allowing the capacitor 62 to charge faster by shunting the biasing resistor 64.

Prior to transistor 51 turning on, the 5 volt power supply through resistor 64 maintains a 5 volt positive bias on the set directs in the flip-flops. As will be recalled, the particular flip-flops employed were the kind in which the set directs were operated by a negative or low input.

Whenever the voltage at point 59 has reached the breakdown voltage of the unilateral switch 61, the unilateral switch will break down and permit the capacitor 62 to discharge through resistor 63, the unilateral switch, and diode 66. At this moment, the prior 5 volt bias on conductor 30 will swing to the negative. Diode 66 has approximately 1 volt forward bias and will consequently prevent the voltage on conductor 30 from swinging below 1 volt. The value of resistor 63 and capacitor 62 are adjusted for an appropriate RC time constant suitable to provide at least the minimum pulse width required for the set direct operation of the flip-flops.

It is in the foregoing manner that a negative going pulse is generated in the good weld sense circuit 21 every time the welding capacitor accomplishes an effective weld dropping the capacitor voltage below 18 volts. It can be seen that if the welding capacitor fails to drop below 18 volts in a given weld cycle, then transistor 51 will not turn on and a good weld sense pulse will not be generated.

Whenever two bad welds have occurred, the bad weld protection circuit, as above described, will open contacts 2CR. Accordingly, after the problem has been noticed and corrected, means must be provided for reactiviting the equipment rendered inoperative by the bad weld protection circuit. This is accomplished in the present circuit by means of a reset button 67. When the button is depressed, the base of transistor 51 is applied to ground through resistor 54 thus turning the transistor 51 on to generate a weld sense pulse which will reset the flip-flops to a binary count of 0.

Connector 68 in the welding sense circuit indicates that the welding capacitor 51 and contacts 2CR$_1$ are located in the controller remote from the welding sense circuit.

As mentioned, the binary counter is stepped by the weld attempt sense circuit 22, which is responsive to a set of normally closed contacts 70. The contacts 70 are located within the controller as indicated by their separation from the remainder of the weld attempt sense circuit by means of connectors 71 and 72. It is to be recalled that the logic between the good weld sense circuit 21 and weld attempt sense circuit 22 is that the weld attempt sense circuit 22 is to generate a pulse after the good weld sense circuit 21. In accordance with this logic, the weld attempt sense circuit 22 is so designed that the negative pulse will be generated upon closure of relay contacts 70. For this reason, the operation of contacts 70 in the controller is set such that, upon initiation of the welding cycle, the contacts 70 are opened. Reclosure of the contacts 70 is set to occur at nearly the end of the welding cycle and after the welding capacitor 89 would have discharged during the normal sequence.

The means by which the weld attempt circuit 22 generates a negative pulse is very much like the operation of the good weld sense circuit 21. A 50 volt source is dropped across a current limiting resistor 73 and a 5 volt Zener diode 74 to provide a constant 5 volt potential on conductor 75. This 5 volt potential supplies power for the low voltage parts of the circuitry. Noise on this 5 volt supply is suppressed by noise suppression capacitor 88.

The forward impedance of the transfer input of the particular J-K flip-flop is very high. Accordingly, there will be a negligible voltage drop across biasing resistor 76 due to very low current. Pulse capacitor 77, diode 78 and noise suppression capacitor 79 isolate conductor 31 from ground, and a 5 volt potential will normally be maintained on the conductor 31 by biasing resistor 76, thus preventing any transfer signal to the first J-K flip-flop until the generation of a negative pulse as will be later described.

Assuming now that the point in the welding cycle has been reached at which the contacts 70 close, then the 50 volt potential will be applied across the contacts 70 and through voltage dividing resistors 80 and 81 to ground. Capacitor 82 will start charging through resistor 80. Consequently, the voltage at point 91 will rise in accordance with the RC time constant of resistor 80 and capacitor 82. The relative values of resistor 80 and 81 are set such that voltage at point 91 will attempt to rise to a point in excess of the firing point of silicon unilateral switch 84.

As the voltages rises at point 91 and before the silicon unilateral switch 84 breaks down, capacitor 77 will be charged through current limiting resistors 85 and 86 and back to ground through the parallel path formed by biasing resistor 76 and diode 87 and lastly through Zener diode 74. Diode 87 has an approximate 1 volt forward conduction and operates as in the case of the good weld sense circuit 21 to prevent the voltage rise on conductor 31 from rising substantially above the positive 5 volts. Once again, diode 87 may also shunt resistor 76, allowing capacitor 77 to charge faster.

The RC time constant of resistor 80 and capacitor 82 is sufficiently slow that the voltage at point 91 will be able to follow the voltage rise on capacitor 82. When the breakdown voltage of silicon unilateral switch 84 is reached, which is approximately 8 ¼ volts, the unilateral switch will go into its conducting state at which approximately 1 volt drop across the switch is experienced. At this point, capacitor 77 will discharge through the current limiting resistor 86 across the silicon unilateral switch and return by way of diode 78. When this occurs, a negative pulse will appear on conductor 31. As in the case of the good weld sense circuit 21, diode 78 is chosen to have approximately 1 volt forward bias and will serve to clamp the voltate on conductor 31 to approximately −1 volt.

The relative size of capacitor 77 and resistor 86 are chosen such that the RC time constant will provide a negative pulse of sufficient duration to accomplish the transfer function of the binary counter. During this period, capacitor 82 will discharge through resistor 85 but not to ground, thus maintaining sufficient voltage on capacitor 82 (by virtue of the current through resistor 80) to supply holding current to unilateral switch 84 via resistor 85.

After capacitor 77 has been discharged, the potential on line 31 will again rise to 5 volts until the cycle is repeated upon the next reclosing of the contacts 70. (It is to be noted that when the contacts 70 are opened, the holding current to unilateral switch 84 will diminish. Resistor 81 then assures that this holding current will go to 0, by virtue of discharging capacitor 82 to substantially 0 volts before contacts 70 reclose. This, in turn, assures that the unilateral switch 84 will turn off before the contacts 70 reclose).

When the 50 volts, which supplies power to the circuitry, first comes on it usually indicates that the welding system is starting up. When the 5 volts then appears in the circuitry, the Dual J-K flip-flop may assume any initial binary code. If it assumes any initial binary code but 3, as soon as the 50 volts has reached nearly its nominal value (of 50 volts), 2CR will operate, and 2CR$_1$ will close. (We assume that the welding capacitor 89 is initially at 0 volts and charges quite slowly for the purposes of our discussion). Then if the RC time constant formed by resistor 57 and capacitor 58 is much shorter than that formed by resistor 80 and capacitor 82, the binary counter will first receive a set direct signal and then a transfer or count signal. This will set it to a count of binary 1, and we may see from considerations above that this will allow the circuitry to properly detect and act upon the first bad weld.

If, however, the binary counter assumes the initial state of 3, then 2CR will not be operated, since transistor 36 will be turned on, and 2CR$_1$ will remain open. Then the binary counter will first receive a transfer or count pulse, which will set it to 0 (or 4). Following this, 2CR will be operated, 2CR$_1$ will close, and the binary counter will receive a set direct pulse, which will not influence it materially, since it is already at a count of 0. Then from the count of 0, if there is one bad weld, the binary counter will stay at 0 and then be advanced to 1 by the weld attempt sense pulse. Following this, from the preceding, we see that the circuit will have ignored the first bad weld and will treat the second bad weld as the first. The circuit will not, however, start out by indicating one or two bad welds before welding has actually started, and we note that this protection may be obtained merely by selecting components so as to form the proper time constants, provided the welding capacitor 89 does not charge too quickly or is not already charged before the 50 volt power starts to appear.

We further note that if contacts 70 had been normally open, the above action of the weld attempt sense circuit in entering a count 1 in the binary counter of in moving the binary counter from an initial count of 3, would not have occurred.

The bad weld detect and control circuits shown in FIG. 1 are adapted for use with a single gun which employs its own independent welding supply and controller. As additional guns are added to the system, identical circuits such as FIG. 2 will be applied to their particular controller and power supply. Accordingly, in an installation employing several welding guns, there will be an equal number of circuits such as shown in FIG. 2 appropriately connected to each of the power supplies and controllers for each of the particular guns.

From the above description of the present invention, it will be appreciated that the bad weld detection circuit of the present invention is very versatile and can be employed with a number of commercially available stud welding apparatuses. Minor modifications may be necessary as for example to adapt the input to the good weld sense circuit to operate with a continuous voltage power supply rather than with a discharge type supply. Likewise, in some particular installations it may be found desirous to operate the contacts 70 in the welding attempt sense circuit 22 in a normally open rather than a normally closed manner. However, the slight modifications would be within the skill of one knowledgeable in the art.

Accordingly, while the present invention has been described with respect to the particular embodiment thereof shown in the drawings, no such limitations are thereby intended on the scope of the invention, but it is to be intrepreted in view of the spirit and tenor of the accompanying claims.

I claim:

1. A weld failure detection control circuit for controlling stud welding apparatus comprising;

circuit means responsive to a successful weld for producing a first signal, circuit means responsive to a weld command for producing a second signal, time delay means for delaying the occurrence of the second signal until the occurrence of the first signal, binary counter means responsive upon the receipt of the first signal to reset to 0 and upon the receipt of successive second signals to count in binary code, and means in circuit with the counter and the stud welding apparatus and responsive to a binary 2 count for lighting an indicator light and responsive to a binary 3 count for disabling the stud welding apparatus from further operation.

2. Stud welding apparatus including a weld failure detection circuit comprising;

a stud welding gun, a controller for initiating and controlling the stud welding cycle, a power supply providing the welding energy for the stud welding gun, a counter, first signal generating means connected between the power supply and the counter and generating a first signal responsive to the conduction of the power supply during the welding cycle for producing a first signal indicative of a bad weld, second signal generating means connected between the controller and the counter for generating a second signal indicative of a weld command, said counter being responsive to the occurrence of both said first and second signals to generate a third signal and, control means in circuit between said controller and the counter and responsive to said third signal for discontinuing operation of the welding apparatus.

3. A weld failure detection circuit for stud welding apparatus employing a stud welding gun, a power supply and a welding controller for controlling the welding cycle comprising;

first circuit means in circuit with the power supply for generating a first signal in response to the discharge of the power supply through the welding gun, second circuit means in circuit with the controller for generating a second signal in response to the initiation of the welding cycle, counter means responsive both to the successive presence of second signals indicating attempted welds and to the absence of first signals indicating bad welds to count the omission of the first and second omitted first signals, and means responsive to the registration of a predetermined number of omitted first signals for altering the welding cycle in a desired manner.

4. The weld failure detection circuit of claim 3 further including a monitoring board and wherein the means responsive to the registration of omitted first signals includes first means connected between the counter means and monitoring board and responsive to the first counter omitted first signal for lighting a light on the monitoring board and second means connected between the counter and the controller and responsive to the second counted omitted first signal for discontinuing the welding cycle.

5. A weld failure detection circuit for stud welding apparatus employing a stud welding gun, a power supply and a controller for controlling the welding cycle comprising;

a binary counter having set direct and transfer inputs and first and second binary column outputs, first circuit means connected between the power supply and the set direct input of the binary counter and providing a set direct input signal to the binary counter upon the discharge of the power supply through the welding gun, second circuit means connected between the controller and the transfer input of the binary counter and responsive to the initiation of the welding cycle to generate a transfer signal, time delay means in said second circuit means to delay the generation of the transfer signal until the time for the normal occurrence of the set direct signal has passed to result in a one binary count following each normal welding cycle, means connected to the second binary column output and responsive to a count of binary 2 for generating a signal indicating the first bad weld, and means in circuit between the controller and both said first and said second digital outputs and responsive to a binary count of 3 for discontinuing further welding cycles upon the occurrence of the second successive bad weld.

6. The weld failure detection circuit of claim 5 further including counter inhibiting means in circuit with said first and second binary column outputs and responsive to a binary count of 3 for preventing the passage of further transfer and set direct signals to the binary counter.

7. Stud welding apparatus including a weld failure detection circuit comprising, a stud welding gun, a controller for initiating and controlling the stud welding cycle, a power supply providing the welding energy for the stud welding gun, a counter, first signal generating means connected between the power supply and the counter and generating a first signal responsive to the conduction of the power supply during the welding cycle for producing a first signal indicative of a bad weld, second signal generating means connected between the controller and the counter for generating a second signal indicative of a weld command, said counter being responsive to the occurrence of both said first and second signals to generate a third signal and, means in circuit between said controller and the counter and responsive to said third signal for altering the weld cycle in a desired manner.

8. A weld failure detection circuit for stud welding apparatus employing a stud welding gun, a power supply and a welding controller for controlling the welding cycle comprising, first circuit means in circuit with the power supply for generating a first signal in response to the discharge of the power supply through the welding gun, second circuit means in circuit with the controller for generating a second signal in response to the initiation of the welding cycle, counter means responsive both to the successive presence of second signals indicating attempted welds and to the absence of first signals indicating bad welds to count the omission of first signals, and, means responsive to the registration of a predetermined number of omitted first signals for altering the welding cycle in a desired manner.

9. In stud welding apparatus of the type employing a stud welding gun, a power supply providing the energy for the stud weld and a controller for initiating the welding cycle and coordinating the discharge of the welding energy through the stud welding gun, the improvements of a bad weld detection and control circuit comprising, first circuit means in circuit with said power supply and responsive to the discharge of energy therefrom to the welding gun for producing a first signal, second circuit means in circuit with said controller and responsive to the initiation of the welding cycle to produce a second signal, and, counter means in circuit with both said first and second circuit means to register the occurrence of a predetermined number of second signals and the absence of a predetermined number of first signals for generating an error signal indicative of a weld failure.

* * * * *